(12) United States Patent
Matsunaga

(10) Patent No.: US 11,004,227 B2
(45) Date of Patent: May 11, 2021

(54) IDENTIFICATION APPARATUS, IDENTIFICATION METHOD AND NON-TRANSITORY COMPUTER-READABLE RECORDING MEDIUM

(71) Applicant: CASIO COMPUTER CO., LTD., Tokyo (JP)

(72) Inventor: Kazuhisa Matsunaga, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 211 days.

(21) Appl. No.: 15/879,643

(22) Filed: Jan. 25, 2018

(65) Prior Publication Data

US 2018/0260970 A1  Sep. 13, 2018

(51) Int. Cl.
| | | |
|---|---|---|
| G06K 9/00 | (2006.01) | |
| G06T 7/60 | (2017.01) | |
| G06T 7/90 | (2017.01) | |
| G06T 7/00 | (2017.01) | |
| G06K 9/62 | (2006.01) | |

(52) U.S. Cl.
CPC ............ *G06T 7/60* (2013.01); *G06K 9/00885* (2013.01); *G06K 9/6292* (2013.01); *G06T 7/0012* (2013.01); *G06T 7/90* (2017.01); *G06K 2209/05* (2013.01); *G06T 2207/10024* (2013.01); *G06T 2207/30088* (2013.01)

(58) Field of Classification Search
CPC .......... G06T 7/60; G06T 7/0012; G06T 7/90; G06T 2207/10024; G06T 2207/30088; G06T 5/009; G06K 9/6292; G06K 9/00885; G06K 2209/05
See application file for complete search history.

(56) References Cited

U.S. PATENT DOCUMENTS

| | | | | |
|---|---|---|---|---|
| 5,836,872 A | * | 11/1998 | Kenet ................. | A61B 5/0059 600/306 |
| 6,757,415 B1 | * | 6/2004 | Rogers ................ | G06K 9/4609 382/130 |
| 6,993,167 B1 | * | 1/2006 | Skladnev ............ | A61B 5/0059 382/128 |

(Continued)

FOREIGN PATENT DOCUMENTS

| | | |
|---|---|---|
| JP | 2015-11686 A | 1/2015 |
| JP | 2017-45341 A | 3/2017 |
| WO | 2016032398 A2 | 3/2016 |

OTHER PUBLICATIONS

JPO; Application No. 2017-044353; Notification of Reasons for Refusal dated May 21, 2019.

(Continued)

*Primary Examiner* — Tom Y Lu
(74) *Attorney, Agent, or Firm* — Fitch, Even, Tabin & Flannery LLP

(57) ABSTRACT

An identification apparatus includes a first one-vs.-rest identifier, a second one-vs.-rest identifier, and a corrector. The first one-vs.-rest identifier identifies a first class among a plurality of classes. The second one-vs.-rest identifier identifies a second class different from the first class among the plurality of classes. The corrector corrects an identification result provided by the first one-vs.-rest identifier using the identification result provided by the second one-vs.-rest identifier.

11 Claims, 6 Drawing Sheets

(56) References Cited

U.S. PATENT DOCUMENTS

| | | | |
|---|---|---|---|
| 7,689,016 B2* | 3/2010 | Stoecker | G06T 7/155 382/128 |
| 9,886,758 B2* | 2/2018 | Abedini | G06K 9/622 |
| 10,586,330 B2* | 3/2020 | Abedini | G06K 9/4642 |
| 2010/0042004 A1* | 2/2010 | Dhawan | A61B 5/7264 600/476 |
| 2010/0158332 A1* | 6/2010 | Rico | A61B 5/4312 382/128 |
| 2016/0253466 A1* | 9/2016 | Agaian | G06K 9/629 382/128 |
| 2017/0231550 A1* | 8/2017 | Do | A61B 5/7264 382/128 |

OTHER PUBLICATIONS

EPO; Application No. 18155959.2; Extended European Search Report dated Jul. 17, 2018.

Oong, Tatt Hee et al., "One-against-all ensemble for multiclass pattern classification", Applied Soft Computing, Apr. 1, 2012, pp. 1303-1308, vol. 12, No. 4, XPO28891370, Elsevier Science B.V., Netherlands.

Matsunaga, Kazuhisa et al., "Image Classification of Melanoma, Nevus and Seborrheic Keratosis by Deep Neural Network Ensemble", Mar. 8, 2017, pp. 1-4, XPO55490871.

Shimizu, Kouhei et al., "Four-Class Classification of Skin Lesions With Task Decomposition Strategy", IEEE Transactions on Biomedical Engineering, Jan. 1, 2015, pp. 274-283, vol. 62, No. 1, XPO11568255, Piscataway, NJ, USA.

Stanley, R. Joe et al., "A relative color approach to color discrimination for malignant melanoma detection in dermoscopy images", Skin Research and Technology, Feb. 1, 2007, pp. 62-72, vol. 13, No. 1, XP55491247.

Codella et al.; "Deep learning ensembles for melanoma recognition in dermoscopy images"; arXiv: 1610.04662, 2016.

Gutman et al.; "Skin Lesion Analysis toward Melanoma Detection: A Challenge at the International Symposium on Biomedical Imaging (ISBI) 2016, hosted by the International Skin Imaging Collaboration (ISIC)" arXiv: 1605.01397, 2016.

* cited by examiner

IDENTIFICATION APPARATUS, IDENTIFICATION METHOD AND NON-TRANSITORY COMPUTER-READABLE RECORDING MEDIUM

CROSS-REFERENCE TO RELATED APPLICATION

This application claims the benefit of Japanese Patent Application No. 2017-044353, filed on Mar. 8, 2017, the entire disclosure of which is incorporated by reference herein.

FIELD

The present disclosure relates to an identification apparatus, an identification method, and a non-transitory computer-readable recording medium.

BACKGROUND

Apparatuses for identifying skin lesion images have been developed. For example, Unexamined Japanese Patent Application Kokai Publication No. 2017-45341 describes a diagnostic apparatus or the like designed to improve identification precision of an ensemble identifier.

SUMMARY

To achieve the objective, an identification apparatus according to the present disclosure includes:

a first one-vs.-rest identifier that identifies a first class among a plurality of classes;

a second one-vs.-rest identifier that identifies a second class among the plurality of classes, the second class being different from the first class; and a corrector that corrects an identification result provided by the first one-vs.-rest identifier using an identification result provided by the second one-vs.-rest identifier.

BRIEF DESCRIPTION OF THE DRAWINGS

A more complete understanding of this application can be obtained when the following detailed description is considered in conjunction with the following drawings, in which.

DETAILED DESCRIPTION

Figure 1:
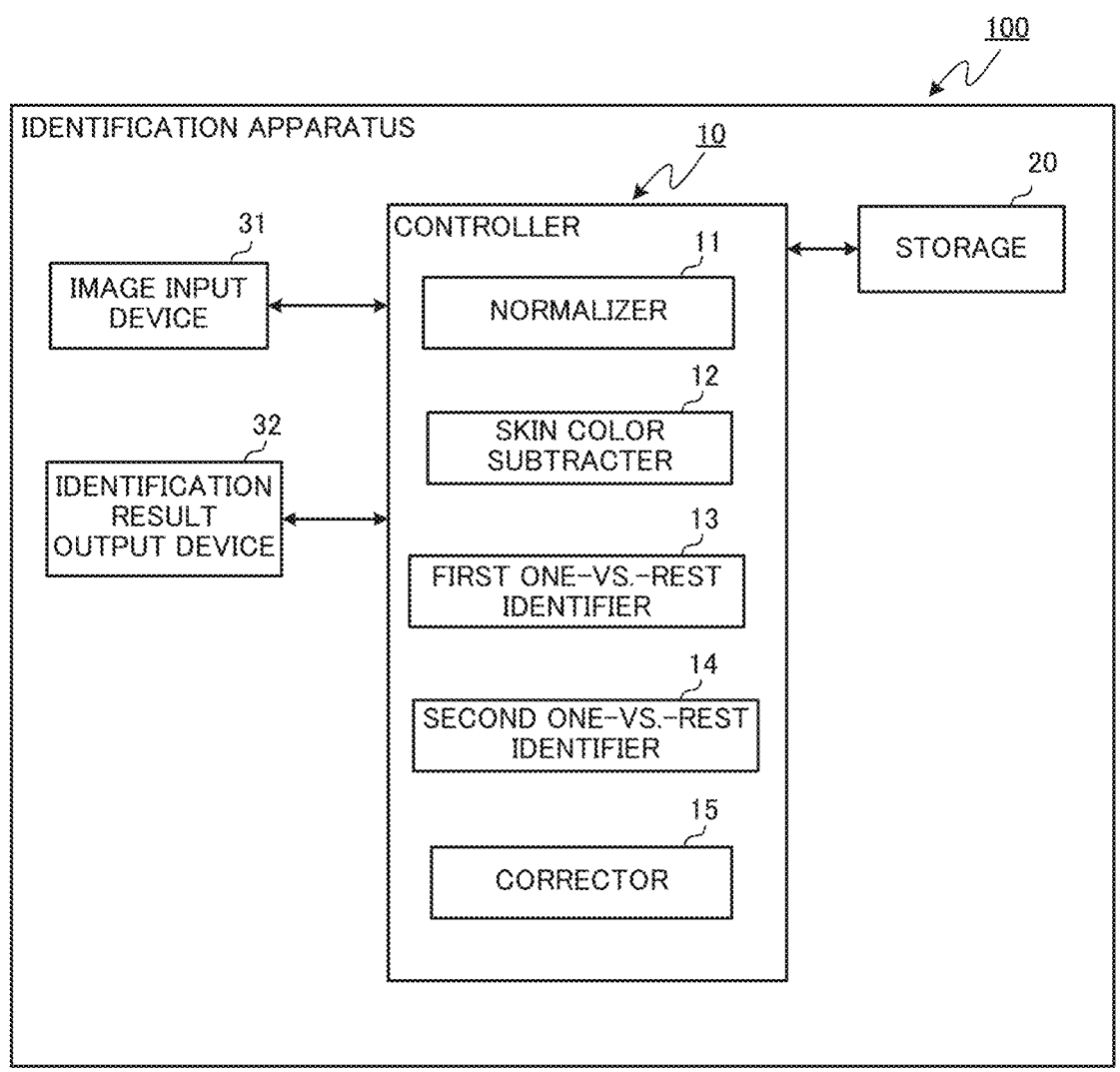
FIG. 1 is a diagram illustrating the functional configuration of an identification apparatus according to an exemplary embodiment of the present disclosure.

The following describes an identification apparatus, an identification method, and a non-transitory computer-readable recording medium according to an exemplary embodiment of the present disclosure with reference to the accompanying drawings in which same reference numerals are given to same or corresponding components.

The identification apparatus 100 according to the exemplary embodiment of the present disclosure identifies whether data of a plurality of classes is of a specific class or another class (class other than the specific class). The identifier that performs such identification is referred to as "one-vs.-rest identifier," "one-vs.-rest classifier," "one-class-vs.-rest class identifier," or the like. This identifier will be herein referred to as "one-vs.-rest identifier."

As shown in FIG. 1, the identification apparatus 100 according to the exemplary embodiment includes a controller 10, a storage 20, an image input device 31, and an identification result output device 32.

The controller 10 includes a central processing unit (CPU), and executes programs stored in the storage 20 to achieve the functions of individual components (normalizer 11, skin color subtracter 12, first one-vs.-rest identifier 13, second one-vs.-rest identifier 14, and corrector 15) which will be described later.

The storage 20 includes a read only memory (ROM) and a random access memory (RAM), and stores programs to be executed by the CPU of the controller 10 and necessary data.

The image input device 31 serves to input image data to be identified by the identification apparatus 100 to the controller 10. The controller 10 acquires image data via the image input device 31. The image input device 31 may be any device from which the controller 10 can acquire image data. For example, when the image data is stored in the storage 20 and the controller 10 accesses the storage 20 to acquire image data, the storage 20 also serves as the image input device 31.

Each pixel of the image data input by the image input device 31 is represented by an RGB value indicating the intensity of red, green, and blue components which are the three primary colors of light.

The identification result output device 32 serves to output the result of identifying an image input from the image input device 31 under the control of the controller 10. The identification result output device 32 may be any device through which the controller 10 can output the identification result. For example, when the controller 10 outputs the identification result to the storage 20, the storage 20 also serves as the identification result output device 32.

Next, the functions of the controller 10 will be described. The controller 10 achieves the functions of the normalizer 11, the skin color subtracter 12, the first one-vs.-rest identifier 13, the second one-vs.-rest identifier 14, and the corrector 15.

Figure 2:
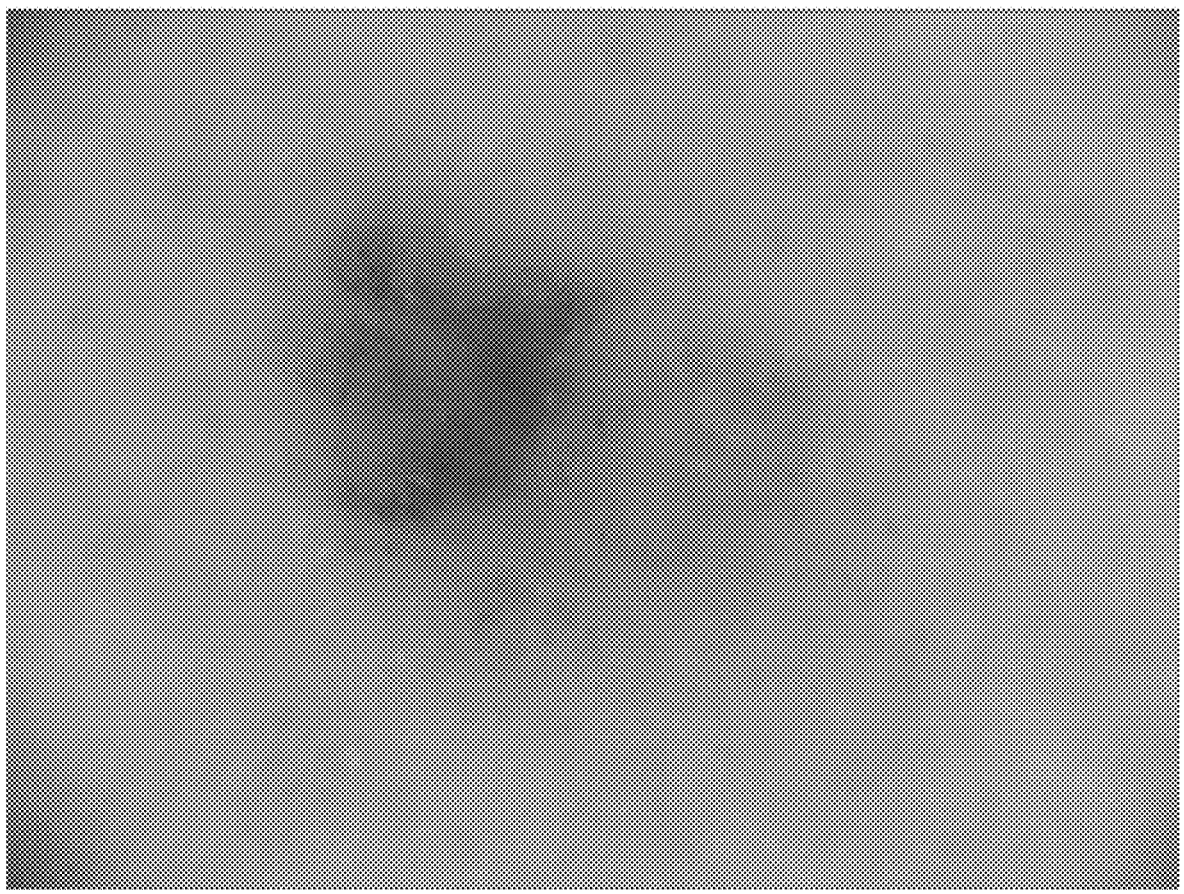
FIG. 2 is a diagram exemplifying image data.
Figure 3:
FIG. 3 is a diagram exemplifying normalized image data.

The normalizer 11 normalizes the color and luminance components of the image data input from the image input device 31. FIGS. 2 and 3 show specific examples of image data before and after normalization, which are actually color images (which are handled by the identification apparatus 100), but are converted into monochromatic images for the purpose of application. FIG. 2 shows an image before normalization, which is a bluish image before being converted into a monochromatic image. FIG. 3 shows an image after normalization, which is a light purple image before being converted into a monochromatic image.

The skin color subtracter 12 subtracts skin color components (skin color RGB values) from the RGB values of the image data normalized by the normalizer 11. This skin color subtraction causes the RGB values of the image of a human skin to be scattered evenly to plus and minus sides, which improves the identification precision of the identifier.

Figure 4:
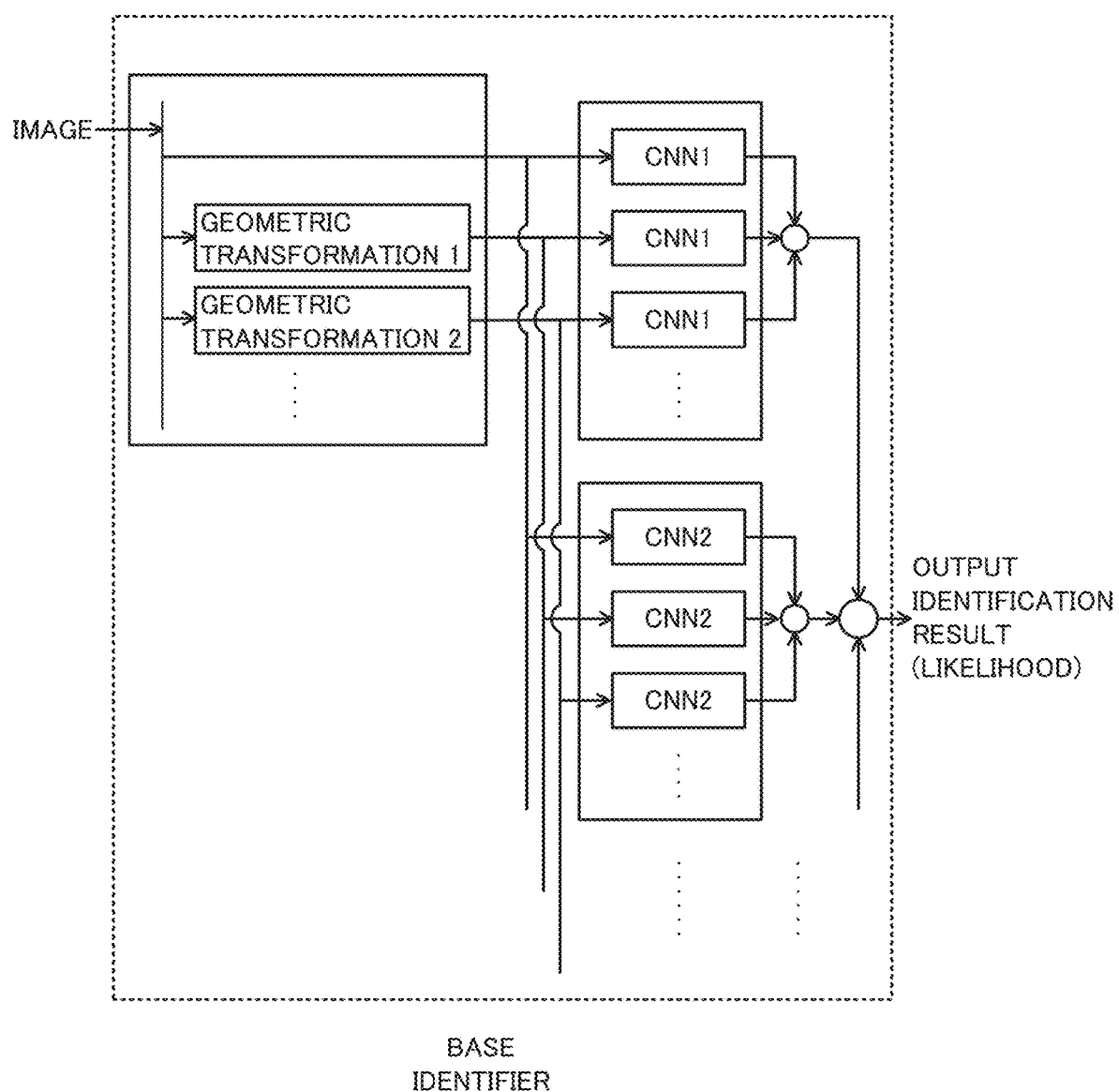
FIG. 4 is a diagram illustrating a base identifier according to the exemplary embodiment.

The first one-vs.-rest identifier 13 and the second one-vs.-rest identifier 14 identify if data of a plurality of classes is of a specific class or another class (class other than the specific class). The identification apparatus 100 uses two such one-vs.-rest identifiers as base identifiers to improve the identification precision. For example, an arbitrary identifier such as a neural network or SVM (Support Vector Machine) may be available as this base identifier. In the exemplary embodiment, the base identifier shown in FIG. 4 is used. The identifier shown in FIG. 4 inputs an input image itself and the image subjected to the geometric transformation processing (rotation, flipping, translation, scaling, and so forth) in parallel to a convolutional neural network (CNN), yielding outputs, and averages the outputs and provides an identification result (predicted value).

The first one-vs.-rest identifier 13 is the base identifier that identifies a class that the identification apparatus 100 intends to identify (herein referred to as "first class") among a plurality of classes. The second one-vs.-rest identifier 14 is the base identifier that identifies a certain class other than the first class (herein referred to as "second class") among the plurality of classes (including the first class). It is required that the identification precision of the second one-vs.-rest identifier 14 be higher than the identification precision of the first one-vs.-rest identifier 13 under a certain condition. Note that this identification precision may be expressed, for example, by the value of an area under the receiver operating curve (AUC) which is an area under a receiver operating characteristic (ROC) curve (it is regarded that the closer to 1 the AUC is, the higher the precision is). It is desirable for the second one-vs.-rest identifier 14 that the AUC is very close to 1. For example, the AUC of the second one-vs.-rest identifier 14 is desirably larger than the AUC of the first one-vs.-rest identifier 13. However, there are other selection conditions for the second one-vs.-rest identifier 14 besides this condition. For example, it is also desirable for the exemplary embodiment that the identification precision (sensitivity) of the second one-vs.-rest identifier 14 with respect to the second class is higher than the identification precision (specificity) of the first one-vs.-rest identifier 13 with respect to the second class (which is included in the plurality of classes for the first one-vs.-rest identifier 13).

The corrector 15 corrects the identification result provided by the first one-vs.-rest identifier 13 according to the identification result provided by the second one-vs.-rest identifier 14. Specifically, correction is performed based on the following equation 1.

$$F_{MM}(x) = \max\{0, \tilde{F}_{MM}(x) - \tilde{C}_{MM} - \alpha(F_{SK}(x) - C_{SK})\} \text{ (if } F_{SK}(x) > C_{SK}) \quad (1)$$

where $F(x)$ is an identifier output for an input image, $C$ is a determination threshold value at which each identifier has an equal error rate (EER), and a tilde indicates a base identifier. Further, $\alpha$ is a coefficient for matching the output scale of the first one-vs.-rest identifier 13 with the scale of the second one-vs.-rest identifier 14, and adjusting how much the output of the second one-vs.-rest identifier 14 is affected by the identification result of the identification apparatus 100. For example, $\alpha$ may be set equal to 1, or may be given by the following equation 2.

$$\alpha = \frac{\tilde{C}_{MM}}{C_{SK}} \quad (2)$$

The equation 1 is applied under the condition that the output ($F_{SK}(x)$) of the second one-vs.-rest identifier 14 exceeds the determination threshold value $C_{SK}$ for the reason that correction is applied only when the output of the second one-vs.-rest identifier 14 has a high reliability.

Figure 5:
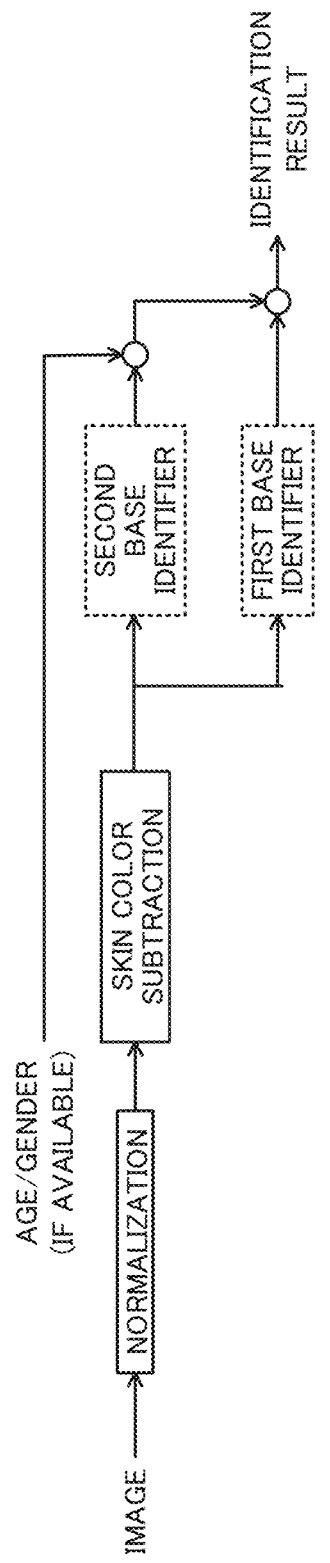
FIG. 5 is a diagram illustrating the contents of the general processing of the identification apparatus according to the exemplary embodiment.

The functional configuration of the identification apparatus 100 has been described above. Next, the contents of the general processing of the identification apparatus 100 will be described with reference to FIG. 5. First, after an image is normalized and subjected to skin color subtraction, the image is input to each of the first base classifier (first one-vs.-rest identifier) and the second base classifier (second one-vs.-rest identifier). Specifically, the first base identifier identifies if a skin lesion is melanoma (MM; malignant melanoma) or another type, and the second base identifier identifies if a skin lesion is seborrheic keratosis (SK) or another type. Since seborrheic keratosis at young ages is generally rare, an identification result from the second base classifier is corrected based on age information and gender information (both of which are therefore added to each image data to be identified). For ages less than 30 years old, even if the identification result from the second base identifier represents seborrheic keratosis, the identification result is corrected to "not seborrheic keratosis." When the identification result from the second base identifier after correction is seborrheic keratosis, even if the identification result from the first base identifier is melanoma, the identification result from the identification apparatus 100 is "not melanoma." (More precisely, the identification result is calculated according to the above equation 1.)

Figure 6:
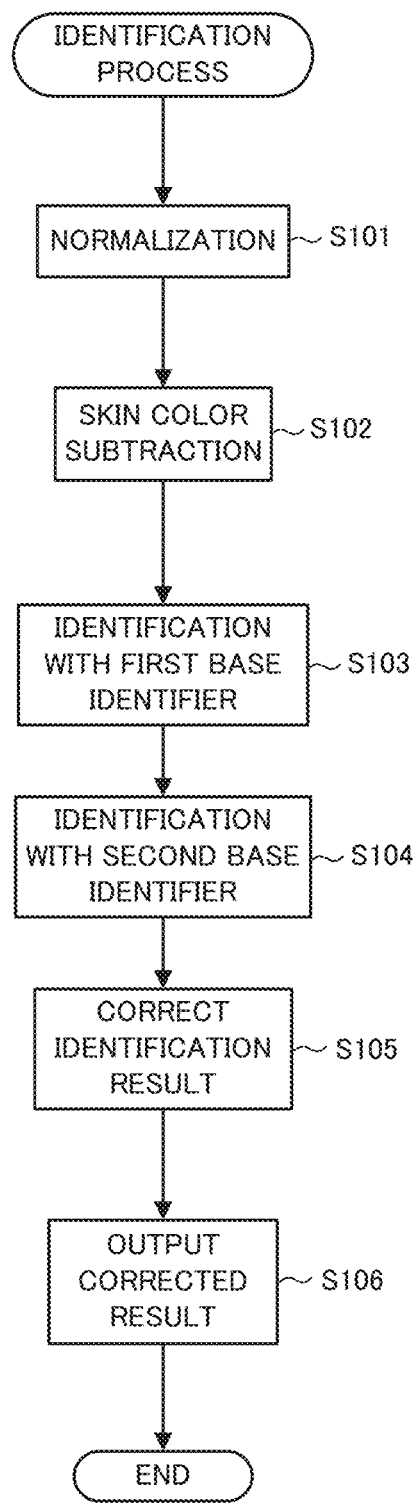
FIG. 6 is a flowchart of an identification process of the identification apparatus according to the exemplary embodiment.

Next, the identification process of the identification apparatus 100 will be described with reference to FIG. 6. This process starts when a user instructs the identification apparatus 100 to initiate the identification process. First, the normalizer 11 of the identification apparatus 100 normalizes an image input through the image input device 31 (step S101). Step S101 is also called a normalization step. Then, the skin color subtracter 12 subtracts the RGB values of a skin color from the RGB values of the normalized image (step S102). Step S102 is also called a skin color subtraction step.

Then, the image with the skin color subtracted is identified by the first one-vs.-rest identifier 13 (step S103). Step S103 is also called a first one-vs.-rest identification step. The image with the skin color subtracted is also identified by the second one-vs.-rest identifier 14 (step S104). Step S104 is also called a second one-vs.-rest identification step.

Then, using the result identified by the second one-vs.-rest identifier 14, the corrector 15 corrects the result identified by the first one-vs.-rest identifier 13 based on the equation 1 (Step S105). Step S105 is also called a correction step. Then, the controller 10 outputs the identification result corrected by the corrector 15 via the identification result output device 32 (step S106), and terminates the identification process. Step S106 is also called an identification result outputting step.

As described above, the identification apparatus 100 corrects the identification result from the first one-vs.-rest identifier 13 using the identification result from the second one-vs.-rest identifier 14, thus providing more accurate identification results.

The results of evaluating the precision of the identification apparatus 100 are illustrated below. This evaluation was made using verification data (150 samples in total) given to the participants of International Symposium on Biomedical Imaging (ISBI) Challenge 2017. Table 1 shows results of comparison of AUCs of the base identifiers provided in the identification apparatus 100. The middle column shows the case where external training data was not used. The rightmost column shows the case where the age/gender information was not utilized. The use of the age/gender information has resulted in an increase in AUC from 0.957 to 0.960 in the cross-validation evaluation of the learning data of the SK identifier (second one-vs.-rest identifier), though there was no difference for the verification data due to the small number of samples available.

TABLE 1

|                  | Identification apparatus 100 | without external training data | without age/ gender |
|------------------|------------------------------|--------------------------------|---------------------|
| MM identifier AUC | 0.899                        | 0.896                          | 0.899               |
| SK identifier AUC | 0.992                        | 0.981                          | 0.992               |
| Mean              | 0.945                        | 0.939                          | 0.945               |

The ISIC-ISBI Challenge 2017 Part 3 validation set scores (tentative)

Table 2 summarizes the results for ISBI Challenge 2016 Part 3 on binary identification to determine whether lesion images are malignant or benign. Regarding this identification, retraining of the identification apparatus 100 was performed. The method published later in 2016 by Codella et al. (Reference 1 to be described later) utilized a deep neural network-based lesion segmentation process, which is not used in the identification apparatus 100.

TABLE 2

|                   | Identification apparatus 100 | Top of 2016 [2] | [1] without segmentation | Best of [1] with segmentation |
|-------------------|------------------------------|-----------------|--------------------------|-------------------------------|
| AUC               | 0.874                        | 0.804           | 0.808                    | 0.838                         |
| Average precision | 0.744                        | 0.637           | 0.596                    | 0.645                         |

The ISIC-ISBI Challenge 2016 Part 3 test set scores (tentative)

The identification apparatus 100 has provided remarkably superior results to the results of the last year (Table 2) which is currently the latest data, even though any lesion image segmentation (or cropping) was not utilized (In Table 2, the second column from the left gives the top of 2016 disclosed in Reference 2 to be described later.) As described in Reference 1, the use of the reliable segmentation method may be expected to further enhance the results of the identification apparatus 100. In addition, a slight effect was observed when the results of identifying seborrheic keratosis with the one-vs.-rest identifiers were corrected using age/gender information.

REFERENCES

1. N. Codella, Q. B. Nguyen, S. Pankanti, D. Gutman, B. Helba, A. Halpern and J. R. Smith, "Deep Learning Ensembles for Melanoma Recognition in Dermoscopy Images," arXiv:1610.04662, 2016.
2. D. Gutman, N. C. F. Codella, E. Celebi, B. Helba, M. Marchetti, N. Mishra and A. Halpern, "Skin Lesion Analysis towards Melanoma Detection: A Challenge at the International Symposium on Biomedical Imaging (ISBI) 2016, hosted by the International Skin Imaging Collaboration (ISIC)," arXiv:1605.01397, 2016.

The individual functions of the identification apparatus 100 may also be implemented by a computer such as an ordinary personal computer (PC). Specifically, the foregoing description of the exemplary embodiment has been given on the premise that the program for the identification process performed by the identification apparatus 100 is stored in advance in the ROM of the storage 20. However, the program may be stored in, and distributed through, a non-transitory computer-readable recording medium such as a flexible disk, a compact disc read only memory (CD-ROM), a digital versatile disc (DVD) or a magneto-optical disc (MO), and may be installed into a computer to provide the computer that may achieve the above-described individual functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An identification apparatus for identifying a skin lesion, comprising:
    an image input device for inputting image data to be identified;
    a processor; and
    a memory for storing a program to be executed by the processor,
    wherein the processor
    executes a processing of
        normalizing a color and luminance components of the image data inputted from the image input device,
        subtracting a skin color component from the normalized image data,
        acquiring, using a first identifier, a first identification result indicating whether the image data with the skin color subtracted indicates a first lesion,
        acquiring, using a second identifier, a second identification result indicating whether the image data with the skin color subtracted indicates a second lesion,
        correcting the first identification result using the second identification result, and
        outputting the corrected first identification result, and
    in correcting the first identification result using the second identification result, when the second identification result indicates the second lesion, corrects the first identification result as not indicating the first lesion even if the first identification result indicates the first lesion.

2. The identification apparatus according to claim 1, wherein a precision with which whether the image data with the skin color subtracted indicates the second lesion is indicated using the second identifier is higher than a precision with which whether the image data with the skin color subtracted indicates the first lesion is indicated using the first identifier.

3. The identification apparatus according to claim 1, wherein the processor
    acquires, using the first identifier, a first identification result indicating whether the image data with the skin color subtracted indicates melanoma, and
    acquires, using the second identifier, a second identification result indicating whether the
    image data with the skin color subtracted indicates seborrheic keratosis.

4. The identification apparatus according to claim 1, wherein each of the first identifier and the second identifier is a neural network or a support vector machine.

5. The identification apparatus according to claim 1, wherein
the image data includes age information, and
the processor, in performing the correction, corrects the second identification result using the age information before correcting the first identification result.

6. The identification apparatus according to claim 1, wherein
the image data includes gender information, and
the processor, in performing the correction, corrects the second identification result using the gender information before correcting the first identification result.

7. The identification apparatus according to claim 1, wherein
the image data includes at least one of age information or gender information, and
the processor, in performing the correction, in a case where the second identification result indicates the second lesion, when at least one of the age information or the gender information satisfies a predetermined condition, corrects the second identification result as not indicating the second lesion, before correcting the first identification result.

8. An identification method comprising:
inputting image data to be identified using an image input device; and
performing processing operations using a processor, the processing operations comprising:
normalizing a color and luminance components of the image data inputted from the image input device,
subtracting a skin color component from the normalized image data,
acquiring, using a first identifier, a first identification result indicating whether the image data with the skin color subtracted indicates a first lesion,
acquiring, using a second identifier, a second identification result indicating whether the image data with the skin color subtracted indicates a second lesion,
correcting the first identification result using the second identification result, and
outputting the corrected first identification result, and
in correcting the first identification result using the second identification result, when the second identification result indicates the second lesion, corrects the first identification result as not indicating the first lesion even if the first identification result indicates the first lesion.

9. The identification method according to claim 8, wherein
a precision with which whether the image data with the skin color subtracted indicates the second lesion is indicated using the second identifier is higher than a precision with which whether the image data with the skin color subtracted indicates the first lesion is indicated using the first identifier.

10. The identification method according to claim 8, further comprising:
acquiring, using the first identifier, a first identification result indicating whether the image data with the skin color subtracted indicates melanoma, and
acquiring, using the second identifier, a second identification result indicating whether the image data with the skin color subtracted indicates seborrheic keratosis.

11. A non-transitory computer-readable recording medium recording a program for allowing a computer to execute:
normalizing a color and luminance components of the image data inputted from an image input device,
subtracting a skin color component from the normalized image data,
acquiring, using a first identifier, a first identification result indicating whether the image data with the skin color subtracted indicates a first lesion,
acquiring, using a second identifier, a second identification result indicating whether the image data with the skin color subtracted indicates a second lesion,
correcting the first identification result using the second identification result, and
outputting the corrected first identification result, and
in correcting the first identification result using the second identification result, when the second identification result indicates the second lesion, corrects the first identification result as not indicating the first lesion even if the first identification result indicates the first lesion.

* * * * *